３,318,566
SOLENOID VALVE
Gus Pike, 10901 Atkinson Ave., Inglewood, Calif. 90303, and Walter M. Cromer, 2138 E. 88th St., Los Angeles, Calif. 90002
Filed Sept. 23, 1963, Ser. No. 310,943
2 Claims. (Cl. 251—48)

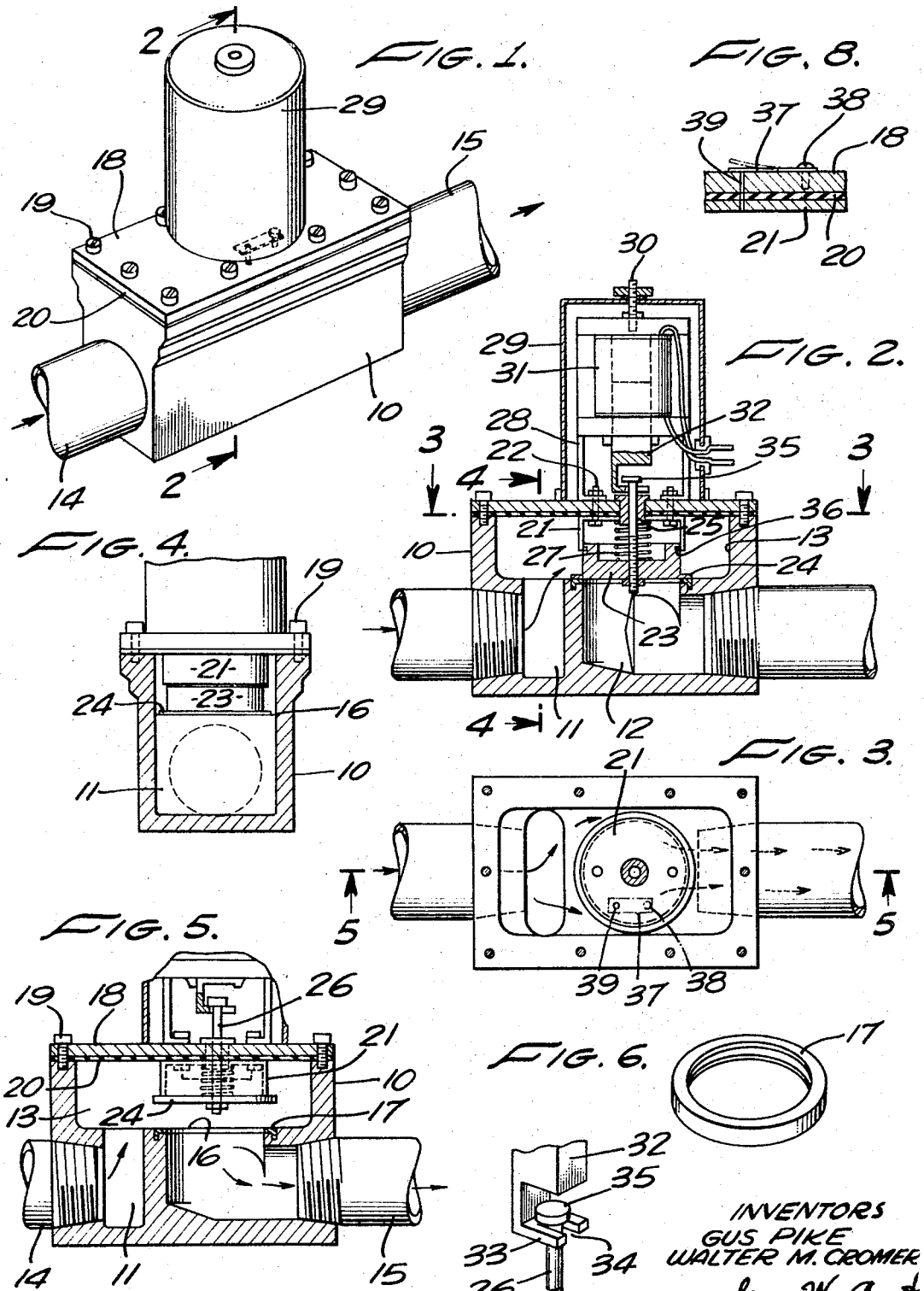

This invention relates to electromagnetically actuated valves for controlling flow of fluid through a pipe system.

Electromagnetically actuated valves for fluid systems are well known and widely used. In this art a common and popular type of valve is the solenoid or plunger type valve. Valves of this type are relatively simple in construction and operation, however, they are subject to a significant operational deficiency, particularly that of deriving sufficient power to drive the solenoid plunger. This deficiency arises from the fact that when the solenoid plunger is in its extended position its pulling force is at a minimum. Furthermore, the valve body is generally retained on the valve seat by the full force of the existing fluid pressure level in the system. Therefore, if it is necessary to move the valve body against a pressure level of 200 pounds for example, and do this by a solenoid plunger which is far removed from its operating coil, there is not sufficient force to effectively open the valve when actuated.

The present invention has therefore been developed to overcome the disadvantages and objections of prior art valves.

It is a primary purpose and objective of this invention to provide a solenoid actuated valve for the control of fluid flow in a pipe system, that is superior in construction and operation to that of prior art valves.

Another object of the invention is to provide a solenoid actuated valve wherein less power is required to actuate the valve than is required in comparable devices.

Another object of the invention is to provide a solenoid actuated valve wherein the closing actuation by a spring is augmented by the fluid pressure flowing in the system.

An additional object of the invention is to provide a novel solenoid actuated valve wherein the initial movement of the solenoid plunger is not resisted by the spring which holds the valve closed.

Other objects and advantages will appear and be brought out more fully in the following description, reference being had to the accompanying drawing, wherein:

FIG. 1 is a perspective view of a valve embodying the present invention;

FIG. 2 is a sectional view of the same taken along line 2—2 of FIG. 1;

FIG. 3 is a sectional view taken along line 3—3 of FIG 2;

FIG. 4 is a sectional view taken along line 4—4 of FIG. 2;

FIG. 5 is a sectional view taken long line 5—5 of FIG. 3;

FIG. 6 is a perspective view of a seal ring feature incorporated in the invention;

FIG. 7 is a fragmentary perspective view showing the plunger and valve stem connection; and FIG. 8 is a fragmentary view in section showing a bleeder valve feature of the invention.

Referring more particularly to the drawing, the valve of this invention is incorporated in a valve body 10 of cast metal or aluminum or equivalent material having an inlet chamber 11 and an outlet chamber 12 and a valve chamber 13 in the upper portion thereof. Suitable connections are provided for an inlet pipe 14 and an outlet pipe 15 to inlet chamber 11 and outlet chamber 12, respectively. Inlet chamber 11 may be of any convenient or desired shape, however outlet chamber 12 has a cylindrical or annular seat 16 communicating with valve chamber 13. Seat 16 is formed with an L-shaped annular groove in which is positioned a resilient seal ring 17 which may be of the O-ring type or may be a formed ring such as of Teflon or neoprene. If desired this seal ring may be incorporated in the valve member to be more fully described hereinafter.

Valve chamber 13 is closed by a removable cover plate 18 which is secured to body 10 as by bolts 19 and a sealing member or gasket 20 is secured between cover plate 18 and the body 10. A valve housing 21 in the form of an inverted cylindrical cup is secured in valve chamber 13 to the under side of plate 18 by bolts 22 or other equivalent securement. Numeral 23 indicates the valve member which is cylindrical in form and having a close although sliding fit within valve housing 21 and has a peripheral or marginal flange 24 which overlies the annular valve seat 16 and the seal ring 17 therein.

A bushing 25 extends through cover plate 18 and a valve guide stem 26 extends through bushing 25 and a spring 27, the spring being compressed between valve 23 and the central plate portion of valve housing 21. Guide stem 26 is suitably secured to valve 23 by threaded securement thereto or the equivalent.

The electromagnet of this invention comprises a frame 28 secured to cover plate 18 as by screws 22 and a housing 29 therefore is secured to the frame as by lock screw securement 30 or the equivalent.

The electromagnet includes a solenoid having a coil 31 and a plunger 32 extending downwardly from the lower end thereof. Plunger 32 has a lifting tongue 33 formed with a slot 34 into which guide 26 extends, the guide stem having a flange head 35 above tongue 33, by which arrangement the guide stem and valve are lifted when the armature plunger 32 is raised by action of the electromagnet winding 31. Valve 23 has an annular groove adjacent the upper end thereof in which is positioned an O-ring seal 36 against the inner wall of the valve housing 21. A flap valve 37 is secured to cover plate 18 as by a screw 38 and overlies a passage 39 in the cover plate 18, the sealing membrane 20 and the top plate portion of valve housing 21.

FIG. 2 shows the normal or unoperated condition of the valve with the valve member 21 seated on the valve seat 16 and held by the action of spring 27. This spring holding action is augmented by the fluid pressure of the fluid in the valve chamber surrounding the valve and acting downwardly on flange 24. The size of flange 24 may be readily determined to provide the necessary amount of holding force in addition to that of spring 27 that is not sufficient to cause an overload of the solenoid during the opening movement of the valve. It will be seen that in this closed position of the valve the head 35 of guide stem 26 is spaced from tongue 33 and, as a consequence, when the solenoid is energized, there is no initial load on the plunger 32. After the plunger moves the fraction of an inch represented by the spacing between the tongue and the guide stem head 35 the plunger has developed sufficient kinetic energy to break the seal of the valve on its seat and start its upward movement. At this stage the plunger is more nearly in the center of the solenoid coil and has a greater lifting force which in turn permits the solenoid to be made of a smaller size than would otherwise be necessary. It will also be noted that the upward lift of the valve is aided by the fluid pressure in the valve chamber 13 which acts on the lower flat side of the valve 23 as is clearly seen in FIG. 5.

An examination of FIG. 2 shows that the upward movement of valve 23 is similar to that of a piston in a cylinder and fast upward action of the valve is permitted by release of fluid in the valve housing 21 by way of passage 39 which lifts flap valve 37 to permit this action. When the valve body moves down towards closing action a slower rate is not undesirable and air is admitted through the relief flap valve 37 at a slower rate than when being discharged therethrough.

From the foregoing description it should be clear that the hereinabove objects and advantages of this invention are achieved in the disclosed valve structure, however, it will be understood that changes and modifications may be made therein without departing from the spirit and scope of the appended claims, the foregoing description being by way of illustration and not of limitation.

What is claimed is:

1. A solenoid-operated normally-closed valve comprising:
   a valve body forming a valve chamber having inlet and outlet openings, a circular valve seat formed around said outlet opening, a valve guide opening formed in a wall of said chamber opposite said valve seat, and a bleeder opening in said chamber wall;
   a hollow cylindrical valve guide housing extending from said chamber wall with said openings communicating with the interior thereof;
   a cylindrical valve member reciprocably disposed within said housing and having an outer end adapted to engage said valve seat;
   pressure seal means between the periphery of said valve member and the wall of said housing;
   a valve guide stem secured to the inner end of said valve member and extending through said valve guide opening;
   a solenoid supported external to said valve body and including a plunger;
   spring means normally biasing said valve member towards said valve seat;
   means providing a lost-motion coupling between said plunger and said valve guide stem;
   and a flap valve secured outside said valve body and normally closing said bleeder opening.

2. A valve as claimed in claim 1 wherein said valve member has a peripheral flange formed on said outer end thereof to increase the opening force required to open said valve.

References Cited by the Examiner

UNITED STATES PATENTS

| | | | |
|---|---|---|---|
| 959,618 | 5/1909 | Schmidt | 251—77 X |
| 1,195,429 | 8/1916 | Acton | 251—77 X |
| 1,773,988 | 8/1930 | Garrison | 251—55 X |
| 1,797,054 | 3/1931 | Doran | 251—77 X |
| 2,285,323 | 6/1942 | Beekley et al. | 251—51 X |
| 2,797,061 | 6/1957 | Buchanan | 251—77 X |

FOREIGN PATENTS 20,556    9/1902    Great Britain.

M. CARY NELSON, *Primary Examiner.*

ARNOLD ROSENTHAL, *Examiner.*